United States Patent
Voglewede (10) Patent No.: US 7,421,006 B2
(45) Date of Patent: Sep. 2, 2008

(54) SYSTEM AND METHOD FOR COHERENT MULTI-H CONTINUOUS PHASE MODULATION WAVEFORM

(75) Inventor: Paul Edward Voglewede, Churchville, NY (US)

(73) Assignee: Harris Corporation, Melbourne, FL (US)

( * ) Notice: Subject to any disclaimer, the term of this patent is extended or adjusted under 35 U.S.C. 154(b) by 822 days.

(21) Appl. No.: 10/800,691

(22) Filed: Mar. 16, 2004

(65) Prior Publication Data
US 2005/0207474 A1    Sep. 22, 2005

(51) Int. Cl.
H04B 1/713    (2006.01)
(52) U.S. Cl. .................................................... 375/132
(58) Field of Classification Search .............. 375/132, 375/133, 134, 135, 136, 137
See application file for complete search history.

(56) References Cited

U.S. PATENT DOCUMENTS

| | | | | |
|---|---|---|---|---|
| 5,610,940 | A * | 3/1997 | Durrant et al. ............. | 375/150 |
| 5,712,877 | A * | 1/1998 | Ho et al. .................... | 375/284 |
| 6,449,304 | B1 * | 9/2002 | Holmes et al. ............. | 375/133 |

OTHER PUBLICATIONS

"Multi-h Phase-Coded Modulation" Iwao Sasase and Shinsaku Mori, IEEE Communications Magazine, Dec. 1991.*
"An Innovative Synchronization Preamble for UHF MILSATCOM", Mark Miller, Mark A.Harris, Donald R.Stephens, 1999 IEEE.*
Anti-Jamming Performance of Slow FH-CPM Signals with Concatenated Coding and Jamming Estimation, Hasung Kim, Qing Zhao, Gordon L.Stuber, Krishna R.Narayanan, 2003 IEEE.*
"Performance Testing of a Concatenated RS-Convolutional Encoding Scheme in AWGN and Impulse Noise Channels" Simeon Toptchiyski, Dimitrios Sofos, Vasilis Stylianakis, Wire Communications Laboratory, University of Patras, Greece.*
Jouko Vanka, Digital Frequency Synthesizer/modulator for Continuous Phase Modulations with Slow Frequency Hopping Helsinki University of Technology, Espoo, Finland, 1996 IEEE.*
Barry K. Levitt, Andreas Polydoros, Marvin K.Simon, "Optimun Detection Of Slow Frequency-Hopped Signals", 1994 IEEE.*
Yiu Ming Lam, Paul H. Wittke, "Frequency-Hopped Spread-Spectrum Transmission with Band-Efficient Modulations and Simplified Noncoherent Sequence Estimation", IEEE Transactions on Communications, vol. 38, No. 12, Dec. 1990.*

(Continued)

*Primary Examiner*—Chieh M. Fan
*Assistant Examiner*—Aristocratis Fotakis
(74) *Attorney, Agent, or Firm*—Duane Morris LLP (57) ABSTRACT

A system and method improves ECCM and data payload for a multi-h continuous phase modulated waveform with the addition of frequency hopping capabilities. The system and method exploit the short constraint length and rotational invariance of the multi-h CPM waveform to enable frequency hopping using current system capabilities. The transmitted data is structured such that the initial phase state of each hopping frame is in the zero state and the final phase state of each hopping frame is cycled to zero by the addition of flushing symbols and transition symbols. The transition symbols allow the oscillator to change frequency without disrupting the phase progression. The system and method uses synchronous demodulation of the transmitted data at a plurality of phase offsets and determines the best phase offset based on the total sum of the branch metrics for each symbol and phase offset. The system and method alternatively demodulated with a phase offset that is tracked and adjusted over each hop by accumulation of the frequency error.

59 Claims, 6 Drawing Sheets

OTHER PUBLICATIONS

Toshiyuki Itoh, Iwao Sasase and Shinsaku Mori, "Coded continuous phase modulation combined with nonuniform mapping and multi-h scheme"—Keio University, Japan, 1988 IEEE.*

Mohamed K.Nezami and Bror Peterson, Performance of efficient tactical UHF-SATCOM waveforms:Occupied bandwidth, coding gain, spectral efficiency, bit error rate and adjacent channel interference, Raytheon Company, 2002 IEEE.*

"Performance Testing of a Concatenated RS-Convolutional Encoding Scheme in AWGN and Impulse Noise Channels" Simeon Toptchiyski, Dimitrios Sofos, Vasilis Stylianakis, Wire Communications Laboratory, University of Patras, Greece, 1999 IEEE.*

* cited by examiner

FIG. 6

SYSTEM AND METHOD FOR COHERENT MULTI-H CONTINUOUS PHASE MODULATION WAVEFORM The need for electronic counter countermeasures (ECCM) in tactical communication systems to provide message security is well established. One common form of ECCM to combat electronic counter measures is the use of frequency hopping. A current hopping system takes the common 16 k bits per second (bps) non-coherent Frequency Shift Keying (FSK) waveform and changes the modulation frequency in a pseudorandom manner. This system transmits several symbols per hop. However, this system is considered slow and is non-coherent.

To demodulate with phase coherency, prior art hopping schemes typically add known pilot symbols to every hop frame. These pilot symbols, while enabling coherent hopping, severely limits the payload throughput. Therefore it is an object of the present disclosure to increase the payload throughput by exploiting the properties of multi-h continuous phase modulation (CPM) waveforms.

Mil-Std188-181B-CPM is an example of a multi-h CPM waveform. The 181B-CPM waveform is a coherent quaternary full-response multi-h continuous phase modulation waveform. During a symbol period the phase of the transmitted signal is linearly ramped (constant frequency) with a slope of $a_i \pi h_i / T_s$, where $a_i$ is a 2 bit data input contained in $\{-3, -1, 1, 3\}$; $h_i$ is the modulation index contained in $\{h_1, h_2\}$ and $T_s$ is the symbol period. Only one modulation index is used per symbol. The modulation index is alternated each symbol. For example, the transmitted symbols may contain a sequence of modulation indices $\{h_1, h_2, h_1, h_2, h_1, h_2, \ldots\}$.

The pair of modulation indices determines the number of phase states in the modulation trellis. The coherent demodulation of the trellis establishes coding gain for the waveform. The coding gain and modulation indices specified in the MIL-STD are shown below in Table 1. Complete details of this waveform can be found in MIL-STD188-181B, the entirety of which is hereby incorporated by reference.

TABLE 1

Coding gain for multi-h CPM waveform.

| Modulation Index (h) | Gain Ref. To MSK (dB) |
|---|---|
| {4/16, 5/16} | 2.3 |
| {5/16, 6/16} | 2.8 |
| {6/16, 7/16} | 3.2 |
| {12/16, 13/16} | 4.5 |

Based on the multi-h CPM structure there are a couple of key properties that are useful for slow Frequency Hopping (FH) applications. These properties are a short constraint length and rotational invariance. The constraint length is the length of time (i.e., the number of symbols) that it takes for two paths that start at the same state to later merge. The constraint length for the 181B CPM waveform is 3 symbols. The other property which can be exploited is rotational invariance.

Rotational invariance implies that the receiver does not require an absolute phase reference. Rather the receiver can receive synchronously on a set of phase references without any performance loss. For example, a demodulator described in Wahlen, Graser, Mai, Burr, "Continuous-Phase Modulation Waveform Simulation", Space and Naval Warfare System Center, 1 Feb. 2000, the entirety of which is hereby incorporated by reference, uses a correlation matched to all the possible received symbols and all the possible states. This information is fed to a "Viterbi decoder" as the branch metrics. The demodulated bits are determined by the transition between states. As a result of demodulating based on transitions and correlation based on all possible states, any sequence can be properly decoded as long as the receiver is synchronized to any one of the valid states. For 181B-CPM, there are a total of 32 possible states. Of these 32 states only 16 are valid for any known symbol in the received sequence. Thus the receiver can be synchronized to any multiple of 22.5 degrees (360°/16) state. Therefore, the phase error will never be greater than |11.25°|.

The 181B-CPM waveforms have the fundamental user rates as defined in Table 2. In addition to the un-coded rates, Reed Solomon (RS) with interleaving options are provided for improved robustness. Table 3, shows the estimated bandwidth for 181 CPM modulations at various modulation rates.

TABLE 2

Modulation and user data rates for the 181-CPM options.

| User Rate (bps) | Modulation Index (h) | Modulation Rate (sps) |
|---|---|---|
| 9600 | 12/16, 13/16 | 4800 |
| 19200 | 12/16, 13/16 | 9600 |
| 28800 | 6/16, 7/16 | 14400 |
| 32000 | 6/16, 7/16 | 16000 |
| 38400 | 5/16, 6/16 | 19200 |
| 48000 | 5/16, 6/16 | 24000 |
| 56000 | 4/16, 5/16 | 28000 |

TABLE 3

Estimated bandwidth for 181B-CPM modulations.

| Modulation rate (sps) | Estimated BW$_{99\%}$ (kHz) |
|---|---|
| 4800 | 17.5 |
| 9600 | 34.9 |
| 14400 | 32.2 |
| 16000 | 35.8 |
| 19200 | 39.0 |
| 24000 | 48.7 |
| 28000 | 50.0 |

To ensure the use of current multi-h CPM waveforms in a tactical environment an ECCM mode is needed. It is an object of the present disclosure to present a novel method and system that fulfills this need while obviating the deficiencies in the prior art. The method and system incorporate the addition of frequency hopping into the multi-h CPM system, while reusing current techniques, capabilities and code already existing in many prior art platforms.

It is a further object of the disclosure to present a novel method of transmitting data as a continuous phase modulation waveform with a set of modulation indices and frequency hopping. The method including generating a plurality of data frames from the data, and for each data frame, coding the data into a sequence of symbols such that the initial phase state is zero, and appending a plurality of other symbols to the sequence to form a hopping frame; wherein the final phase state of the hopping frame is also zero. The method further includes modulating a fixed frequency carrier with the sequence of symbols for each hopping frame using a repeated sequence of the set of modulation indices, and transmitting each successive modulated hopping frame at a different frequency. The method thus enables frequency hopping transmission of the data as a continuous phase modulation waveform.

It is also an object of the disclosure to present a novel method of receiving a data signal transmitted as a continuous phase modulation waveform with a set of modulation indices over a series of different frequencies, where the data signal is formed of a plurality of hopping frames. The method including demodulating one of the hopping frames at a predetermined frequency and phase offset with a repeated sequence formed from the modulation indices to obtain a set of demodulated data symbols and a set of demodulated other symbols for each frame. The method also includes decoding the set of demodulated data symbols beginning at state "zero" to recover the data and decoding the set of other symbols to thereby return to the zero phase state. In the method, the receiver is transitioned to a different frequency over a known period for each successive hopping frame. The method thus enabling the reception of the transmitted data.

It is yet another object of the disclosure to present a structure for a hopping frame used to transmit data as multiple-modulation indices continuous phase modulation waveform with frequency hopping. The frame including a fixed number of symbol periods with a first sequence of trellis coded symbols containing the transmitted data, such that the initial phase state is zero. The first symbol of the first sequence is located in the first symbol period. The frame also includes a second sequence of trellis coded symbols, the number of which is equal to the constraint length which is determinable by the modulation indices. The second sequence brings the phase state at the end of the second sequence to zero. The first symbol of the second sequence in the frame is adjacent to the last symbol of the first sequence. In the frame, the first and second sequences combined do not exceed the frame length.

It is still another object of the disclosure to present an improvement to a method of communicating data with a multiple modulation index continuous phase modulation waveform as trellis coded symbols at a fixed frequency. The improvement directed to increasing the ECCM of the signal by implementing frequency hopping, includes transmitting the data in a hopping frame. Each hopping frame beginning and ending with a phase state of zero. Successive hopping frames in the method are transmitted at different frequencies.

It is an additional object of the disclosure to present an improvement to a method of communicating data with a multiple modulation index continuous phase modulation waveform as trellis coded symbols in data frames. The improvement directed to increasing the data payload employs frequency hopping and decodes each frame independently of the other frames, with out resorting to the use of pilot symbols.

It is also an additional object of the disclosure to present a system for improving the ECCM capabilities of a multiple modulation indices continuous phase modulation waveform communication system. The system includes a receiver for receiving trellis coded data group in successive data packets. The improved receiver includes demodulation means that demodulates using a set of modulation indices and phase offsets. The receiver also includes decoding means for decoding the symbols. The decoder is sequenced to phase state "zero" at the beginning and end of each data packet. The receiver also includes a switching means for switching the frequency for each successive data packet.

These objects provide ECCM protection with a frequency hopping signal and increased payload, while adding little complexity to existing systems. These advantages are realized by exploiting the properties of a multi-h CPM waveform while preserving compatibility with current receiver demodulators.

These and other advantages of the disclosed subject matter will be readily apparent to one skilled in the art to which the disclosure pertains from a perusal or the claims, the appended drawings, and the following detailed description of the preferred embodiments.

DETAILED DESCRIPTION

To provide improved ECCM to a Multi-h CPM waveform communication system, frequency hopping is advantageously employed. However, each state of the signal, as a consequence of trellis coding is dependent upon the last state. Each frequency hop may result in a random initial phase condition which may preclude extraction of transmitted data. To provide a consistent starting point for each hop and a robust end for the trellis decoder, it is desirable for the trellis state to begin and end at the same state for every hop. By structuring or blocking the transmitted data according to the subject matter presented in this disclosure over a hop, each hop can be demodulated independently from every other hop.

As shown above the 181B-CPM waveform with modulation indices of {4/16, 5/16} has a phase value at the end of the $a_i$ symbol described according to the following equation:

$$\Phi_i \Phi_{(i-1)} \pi a_i h_i. \tag{1}$$

Starting at zero phase (state "zero"), the next state is in the set of {4, −4, 12, −12}, this next state is obtained by multiplying the modulation index $h_i$ (4/16) by $a_i$, where the denominator and π are factored out and ignored here for purposes of clarity. The next input (data bits) is modulated by the alternate modulation index $h_2$ (5/16) using equation 1 and results in a state contained in the set of {±1,±3,±7,±9,±11, ±17,±19,±27}. Wrapping the phase value between π and −π results in the states being rewritten as {±1,±3,±7,±9,±11,±15, ±13,±5}. As can be seen, all the odd states are possible. The third symbol ($h_1$=4/16) will again result with a state in the set of all the odd states, while the fourth symbol, modulated by ($h_2$5/16) will result in a state in the set of all possible even states. Thus, the system can return to state "zero". This example shows a return to state "zero" in four symbols, however if the system is in any even state (which "zero" is one of) and the modulation index $h_i$ starts with the odd numerator, it should be apparent that it only requires 3 state transitions (symbols) to return to the phase state "zero". Therefore, in a system hop starting in state "zero", applying the modulation index with the odd numerator first, the system hop can be returned to the state "zero" with only 3 symbol transitions. Therefore, by enabling each hop to start and end in the "zero" state, the hop can be demodulated without knowledge of the previous hop end state.

Figure 1:
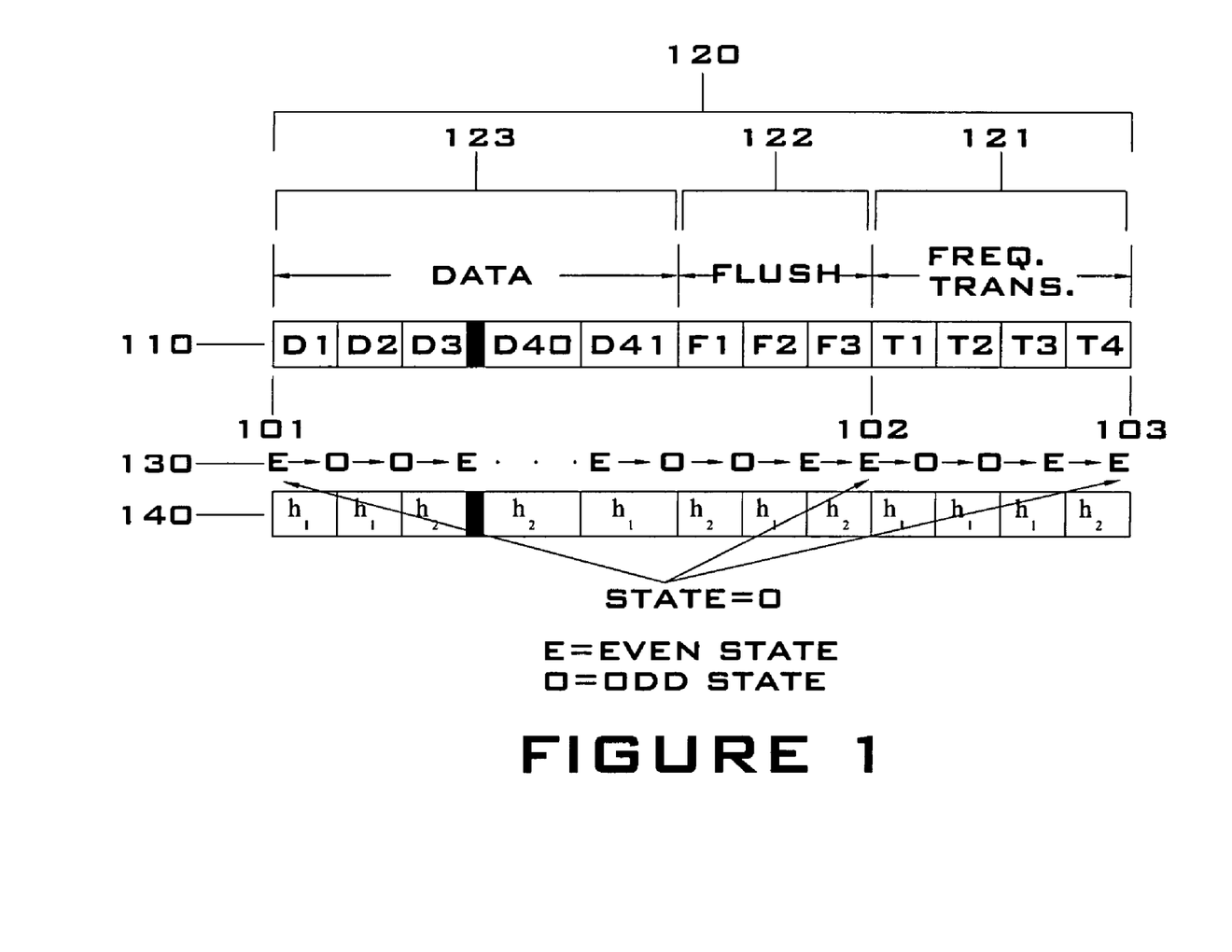
FIG. 1 is a illustrative example of a symbol structure per hop frame for a 9.6 k symbols per second (sps) 181B-CPM waveform communication system according to an embodiment of the disclosed subject matter.

To enable demodulation in a hop as described above independently of the previous hop, the data packet is structured over the hop period. FIG. 1 illustrates the hop period 100 for the 9.6 k sps case. During the hop period 120, a percentage of the time the oscillator will be transitioning to the next frequency. If for example, the frequency transition period 121 of the oscillator is a multiple of 4 symbols, it can be seen that the transmitting modem can be returned to the same state zero after each multiple of 4 symbols. As seen in FIG. 1, the transition period 121 is composed of 4 symbol periods T1-T4 in which the phase state starts and ends in the zero phase state. Using a 9.6 k/s symbol rate and a hopping rate of 200 hops per second (hps), a total of 48 symbols will fit into the hop frame. Allocating 4 symbols for frequency switching (0.416 ms), and 3 symbols 122 for flushing the transmitter back to state "zero" as described previously, there remains 41 symbols left for data 123 per each hop frame. These symbol periods are shown as D1-D41 in FIG. 1.

The even and odd state of the encoder for each respective symbol period are also shown in FIG. 1. Of course the "E" designating a even state and the "O" designating an odd state. The initial state 101, the state 102 after the $3^{rd}$ flush symbol, and the final state 103 are all the even state "zero", and the sequence of modulation indices of the states is the same. This allows for the use of circular demodulation techniques and also allows the modulator to maintain the modulation index order into the next frequency hop. Allowing the frequency transition to be a multiple of 4 symbols simplifies the physical layer (PHY) in the modem implementation. This is because the physical layer will continue the $(h_1, h_2)$ sequence 140 requiring no knowledge of the hopping or packet properties. The MAC layer in the modem can insert the flush 122 and transition bits 121. While this assignment of operation regarding the PHY and MAC layers is not required, it may be advantageous with respect to simplicity.

In the example shown, a close examination of the hopping data I/O rate results in a hopping data rate of 16.4 k bps as shown below.

$$HOP_{IO} = 9.6 \text{ kps} \times 2 \text{ bit/sym} \times \frac{41(\text{data symbols})}{48(\text{frame symbols})} = 16.4 \text{ kbps}$$

Conveniently if one of the data symbols is ignored or used as a pilot symbol, the resulting data rate:

$$HOP_{IO} = 9.6 \text{ kps} \times 2 \text{ bit/sym} \times$$
$$\frac{(41(\text{data symbols}) - 1(\text{pilot symbol}))}{48(\text{frame symbols})}$$
$$= 16.0 \text{ kbps}$$

Since the data rate matches nicely with a common user rate, it is advantageous to use only 40 data bits. Data symbol D41, shown in FIG. 1 can thus be ignored or used as a pilot symbol. The exact location of the symbol is not important as long as it is known.

For coherent demodulation of the data signal, frequency and phase estimations are required for the demodulation algorithms. If the system is based on a fixed clock rate and is stationary, the frequency error for each hop is proportional to the carrier frequency. An initial offset frequency can be advantageously determined during the hopping timing synchronization or preamble stage. Thus the frequency offsets are known or determined with little frequency error.

Figure 2:
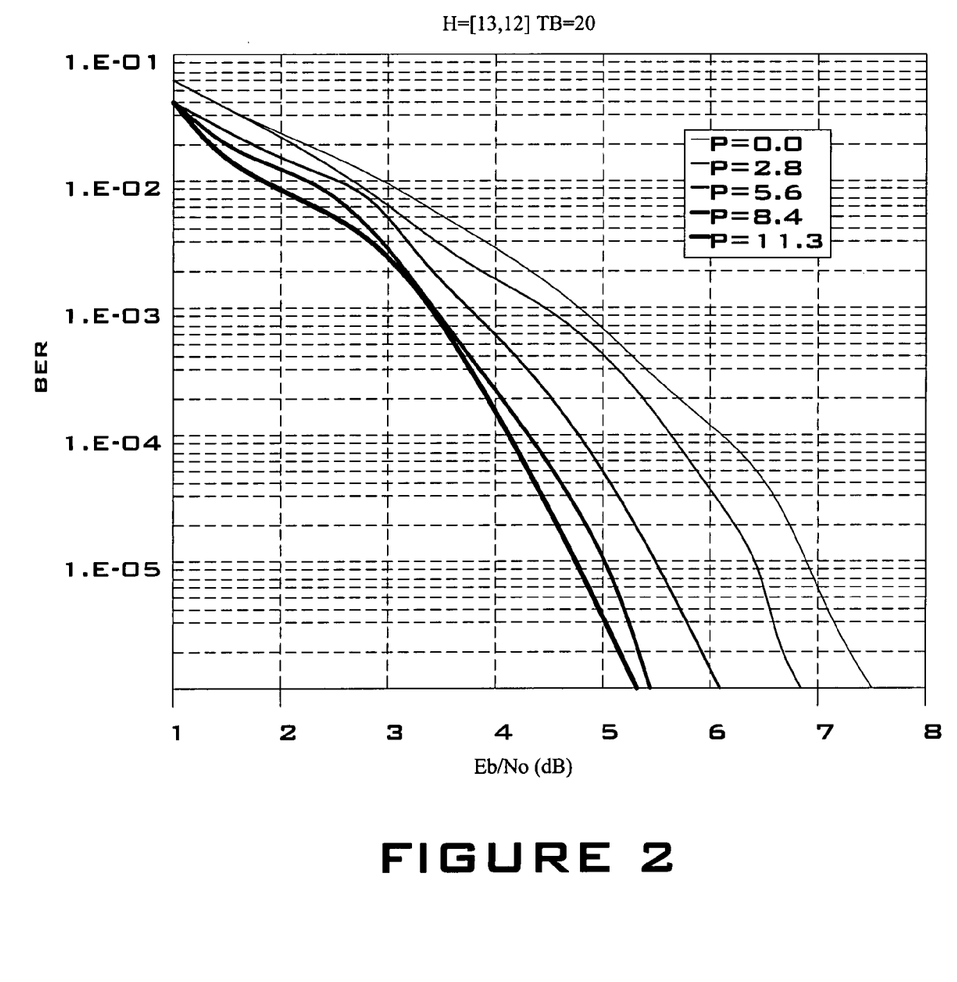
FIG. 2 is a representative chart of the performance of an 181B-CPM system with constant phase error for an embodiment of the disclosed subject matter.

As indicated previously the 181B-CPM waveforms are rotationally invariant. FIG. 2 illustrates a simulated performance of the h={13/16, 12/16} 181B-CPM waveform for a variety of constant phase errors up to the worst case of 11.25 degrees as established previously. From FIG. 2 it can be seen that there is approximately a 0.25 dB performance loss for a phase error of 2.8125 degrees. Hence, by demodulating the received packets 5 times with phase offsets of 0, 2.8125, 5.625, 8.3475 and 11.25, the maximum phase error will be less than or equal to half of the 2.8125 degree step or 1.40625 degrees resulting in a low performance loss of less than 0.25 dB.

To determine which of the phase offsets produce the correct demodulation, the sum of the winning path metrics for each symbol is tabulated. The phase offset that produces the largest total path metric sum is selected as the valid solution.

Since the phase error due to a frequency offset is small over the hop duration and the number of valid symbols per hop is a multiple of 4, the demodulator can reuse the first few symbols to flush the data out of the Viterbi decoder. This type of phase demodulation is the circular demodulation referred to earlier. Using this technique, any common Viterbi decoder currently used today, can also be used to demodulate the hop packet.

Figure 3:
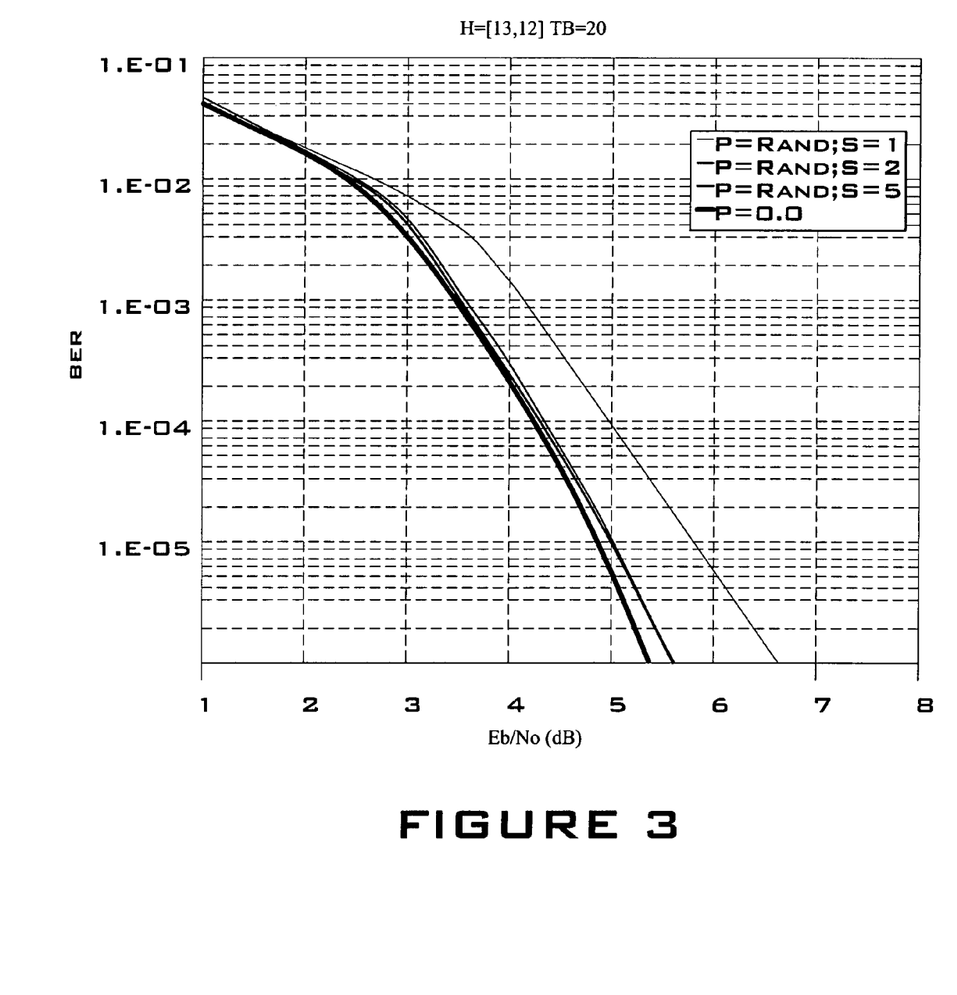
FIG. 3 is a representative chart of the BER performance of iterative phase demodulation for an embodiment of the disclosed subject matter.

An unexpected side result apparent in FIG. 3 is the small difference between the S=2 and S=5 curves. There appears to be a large improvement (1 dB at 1e−5) between one and two phase hypotheses. There appears to be very little difference (0.1 dB at 1e−5) between two and five phase hypotheses. This seems to contradict the expectations set by examining FIG. 2.

To investigate this phenomenon, closer examination of the two hypothesis case is required. When the demodulator is allowed to chose between two phase hypothesis, it predominately selects the one with fewer bit errors due to better overall path metrics. Thus, as shown in FIG. 3, just two phase hypotheses approach the performance of five phase hypotheses. The resulting performance loss for a 48 symbol frame with h equal to {13/16, 12/16} at 1e−5 BER is approximately 0.2 dB relative to the known phase error case.

Figure 4:
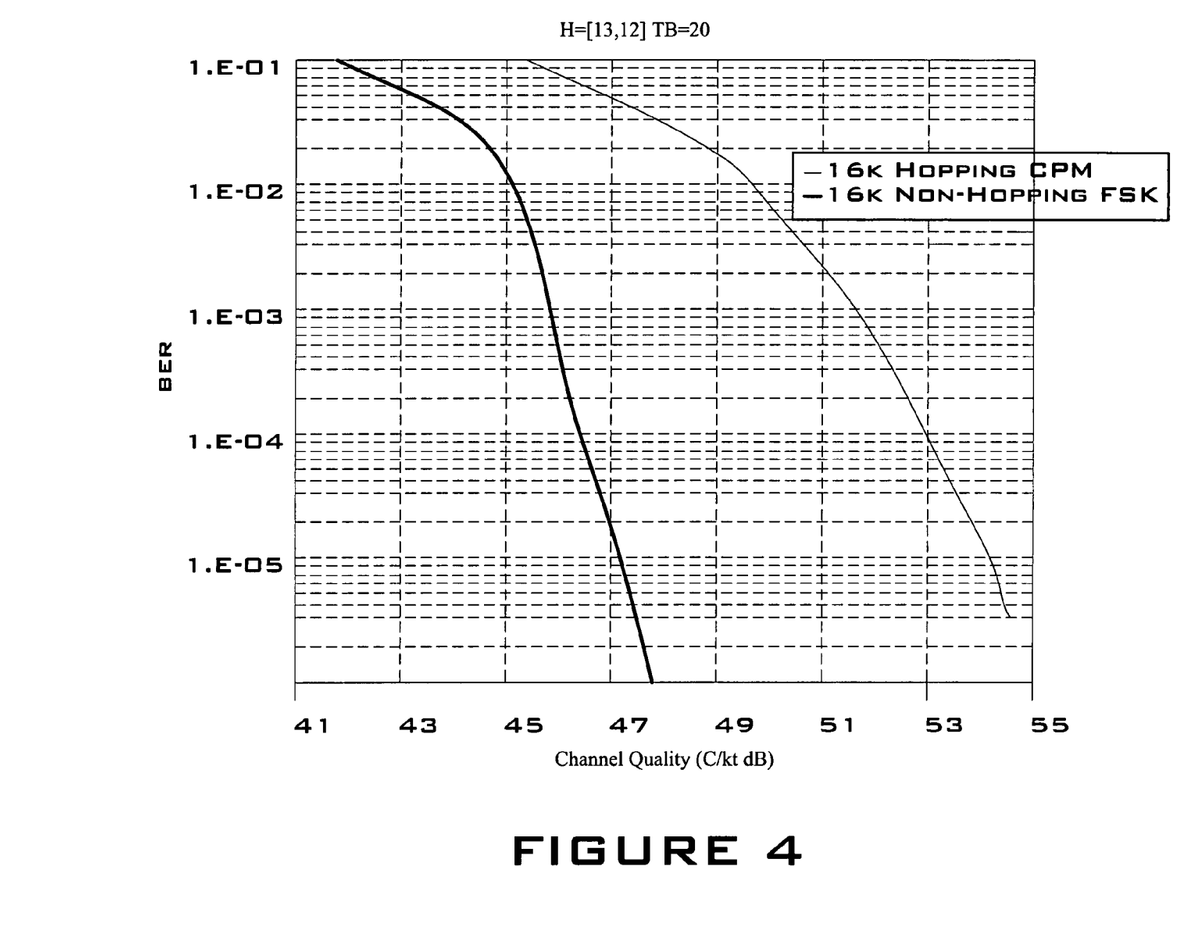
FIG. 4 is a representative comparison chart of a 16K 181B-CPM frequency hopping system according to an embodiment of the disclosed subject matter and a non-hopping prior art tactical 16 k FSK.

A comparison of the 181 B-CPM frequency hopping system with a user I/O data rate of 16 k bps against prior art conventional single frequency tactical 16 k FSK is shown in FIG. 4. The x-axis in this case is in terms of the channel quality measured in signal to noise density ratio. This plot gives a measure of the performance advantage for using the hopping multi-h CPM compared to a standard waveform employed in the prior art. The Figure illustrates that there is in excess of 6 db gain for the multi-h CPM hopping technique over the conventional tactical 16k bps FSK. Compound frequency hopping on the 16 k bps FSK and the gains for the hopping multi-h CPM are even greater.

Figure 5:
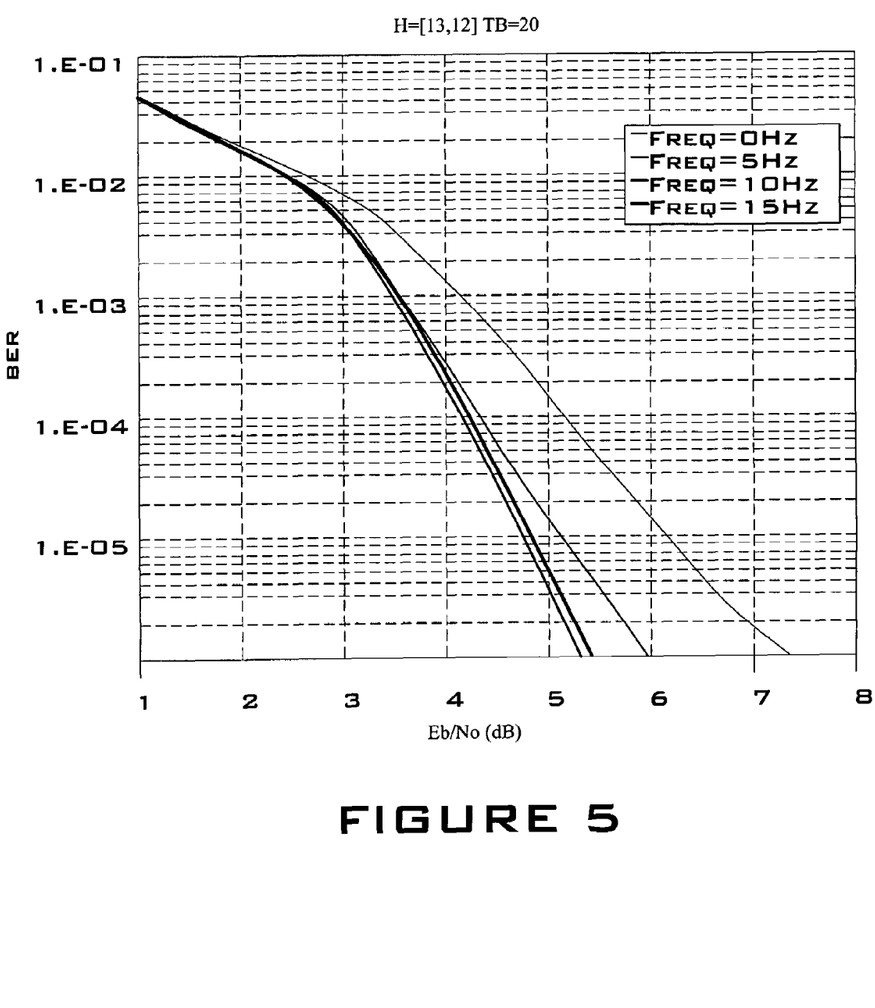
FIG. 5 is a representative chart of the bit error rate (BER) performance in the presence of a frequency error for an embodiment of the disclosed subject matter.

The performance of the iterative phase demodulation in the presence of a frequency error is shown in FIG. 5. For this approach, the estimated frequency for the initial synchronization phase must be within 10 Hz. To improve performance during the transmission, frequency tracking can be performed during the demodulation process. An existing frequency tracking algorithm as described in Morelli, Mengali and Vitetta "joint Phase and Timing Recovery With CPM Signals", IEEE Transactions On Communication, Vol 45, No 7, July 1997, the entirety of which is hereby incorporated by reference, can be used in the frequency hopping system of the present disclosure. The difference, when used for frequency hopping is that the accumulated frequency error for the winning phase iteration is carried over to the next hop and multiplied by the ratio of the next frequency to the previous frequency. The result is used to adjust the frequency offset for the next frequency hop. In this manner, the frequency error can be minimized without the addition of pilot symbols.

As in any frequency hopping system, a given percentage of the frequencies will be jammed. Of course frequency hopping was developed with the realization that using multiple frequency increases the chances of transmitting on a jammed or occupied frequency, but also recognized the amount of degradation caused by the jammed frequency to the entire communication would be also be reduced. This jamming signal can be the result of innocuous use of the frequencies by other, hostile efforts, or even internal radio spurs. To overcome the bit error on poor frequencies, additional coding and interleaving over multiple hop frames can be used. The 181B CPM specification contains outer code options for interleaving and Reed-Solomon (RS) coding. The basic tools can be reapplied for the hopping waveform.

The RS code for the 181 B-CPM hopping waveform can be derived from the same (127, k) RS code with 7 bits per RS symbol or the (63, k) RS code with 6 bits per RS symbol used in the military standard [6]. Utilizing a code rate of 0.9, the final user bit rate is 14.4 k bps (16 k*0.9).

Based on the two available codes, a shortened code of (60, 54) from the (63 ,k) RS code can be used with a correction capability of 3 RS symbols per RS code word. With 80 bits per hop and 6 bits per RS symbol there are 13.333 RS symbols per hop. A jammed hop results in 14 corrupted RS symbols. The RS code word spans 4.5 hops (60 symbols/word*6 bits/symbol/80 bits/hop). On average, it requires 4.666 RS code words to correct one jammed channel. This corresponds to one of twenty-one hops (4.5*4.666) being corrected for a maximum jam correction rate of 4.76%.

To achieve the average jamming performance, an interleaver is required. Once again, the interleavers present in the current military standard may be reused, for example.

Figure 6:
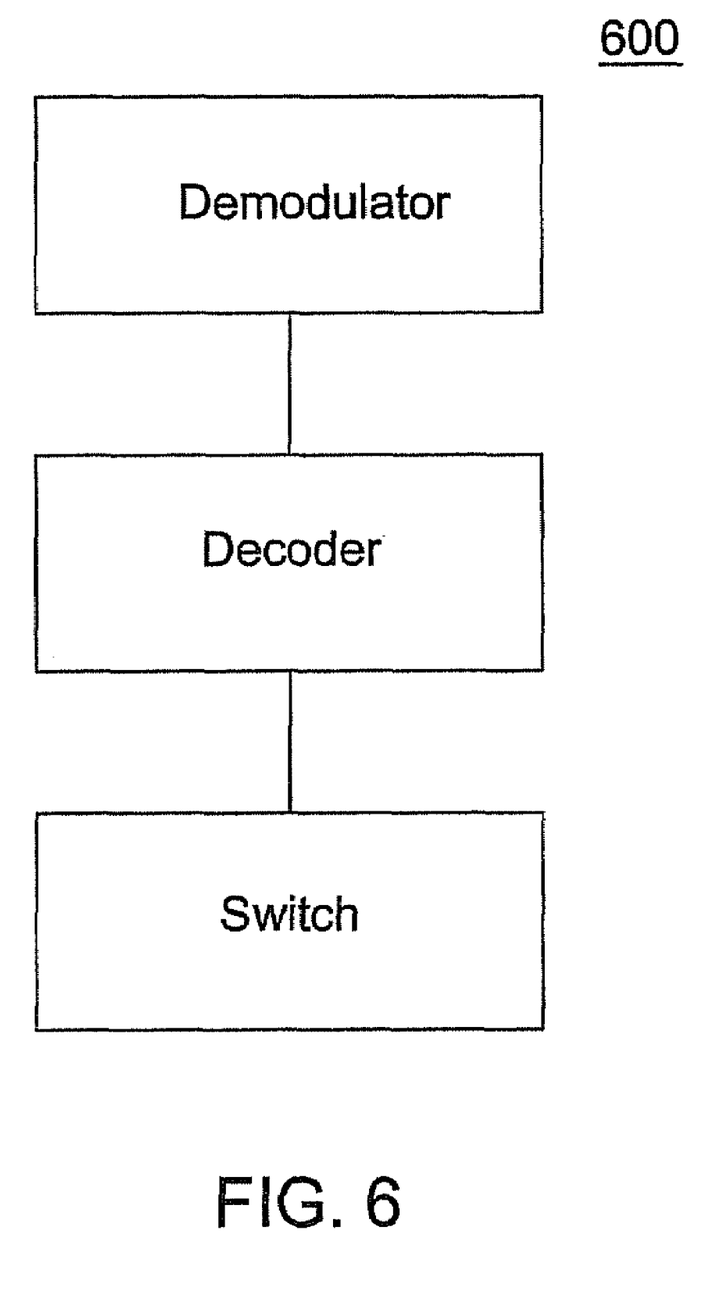
FIG. 6 is a block diagram of a receiver according to an embodiment of the present subject matter.

To extend the capability described herein to other modulation rates, similar analysis can be performed for each fundamental rate. One analysis results in a system with a set of data rates as shown in Table 4. FIG. 6 is a block diagram of a receiver according to an embodiment of the present subject matter. These solution examine a fixed hopping rate of 200 hps and an allotted frequency transition time of 416 microseconds.

TABLE 4

| RS I/O Rate | Hop I/O Rate | Modem Rate | RS Code (63, k) Base | Max % Jam |
|---|---|---|---|---|
| 14.4k | 16.0k | 19.2k | (60, 54) | 4.76 |
| 16.0k | 19.2k | 28.8k | (60, 50) | 8.33 |
| 28.8k | 32.0k | 38.4k | (60, 54) | 4.94 |
| 32.0k | 38.4k | 48.0k | (60, 50) | 8.33 |
| 38.4k | 48.0k | 56.0k | (60, 48) | 10.00 |

The application of the subject matter, while illustratively described with a MIL-STD188-181B CPM waveform, can be accomplished with any number of multi-h CPM waveform using the associations of modulation indices, constraint length, rotational invariance, symbol rate and hopping rate presented herein. While preferred embodiments of the present inventive system and method have been described, it is to be understood that the embodiments described are illustrative only and that the scope of the embodiments of the present inventive system and method is to be defined solely by the appended claims when accorded a full range of equivalence, many variations and modifications naturally occurring to those of skill in the art from a perusal hereof.

I claim:

1. A method of transmitting data as a continuous phase modulation waveform with a set of modulation indices and frequency hopping, comprising the steps of:
   generating a plurality of data frames from the data;
   for each data frame, coding the data into a sequence of symbols wherein the initial phase state is zero, and appending a plurality of other symbols to the sequence of symbols to form a hopping frame wherein the final phase state of the hopping frame is zero;
   modulating a fixed frequency carrier with the sequence of symbols for each hopping frame with a repeated sequence comprised of the set of modulation indices; and,
   transmitting the modulated hopping frame;
   wherein the carrier frequency for successive hopping frames are different, thereby enabling frequency hopping transmission of the data as a continuous phase modulation waveform.

2. The method of claim 1, further comprising the step of placing a predetermined transition period between transmission of each successive hopping frame.

3. The method of claim 1, wherein the set of modulation indices includes odd and even modulation indices and the odd modulation index is used first.

4. The method of claim 1, wherein the phase states represented by the symbols in the hopping frame proceed in a repeated sequence of even state, odd state, odd state and even state.

5. The method of claim 1, wherein the sequence of symbols are interleaved.

6. A method of receiving a data signal transmitted as a continuous phase modulation waveform with a set of modulation indices over a series of different frequencies, wherein the data signal is comprised of a plurality of hopping frames, comprising the steps of:
   (i) demodulating one of the hopping frames at a determined frequency and phase offset with a repeated sequence formed from the set of modulation indices to obtain a set of demodulated data symbols and a set of demodulated other symbols for each frame;
   (ii) decoding the set of demodulated data symbols beginning at state "zero" to recover the data and decoding the set of other symbols to return to the zero phase state; and,
   (iii) for a successive hopping frame, transitioning the receiver to a different frequency over a transition period thereby enabling the reception of the transmitted data.

7. The method of claim 6 wherein the step of demodulating one of the hopping frames further includes demodulating the hopping frame synchronously at a plurality of predetermined phase offsets.

8. The method of claim 6 wherein the step of demodulating one of the hopping frames further includes tracking and accumulating the frequency error during the hopping frame and carrying over the accumulated frequency error to a subsequent hopping frame.

9. The method of claim 6, wherein the step of demodulating one of the hopping frames includes circular demodulation.

10. The method of claim 6, wherein the set of modulation indices includes odd and even modulation indices and the odd modulation index is used first.

11. The method of claim 2, wherein the predetermined transition period is a multiple of 4 symbol periods.

12. The method of claim 1, wherein the coding is trellis coding.

13. The method of claim 12, wherein the sequence of symbols are Reed-Solomon coded.

14. The method of claim 1, wherein the plurality of other symbols are selected from the sequence of symbols.

15. The method of claim 1, wherein the hopping frame and transition period combined is 48 symbols in length.

16. The method of claim 15, wherein the first 41 symbols are data symbols.

17. The method of claim 15, wherein the first 40 symbols are data symbols and the $41^{st}$ symbol is a pilot symbol.

18. The method of claim 1, wherein the other symbols include a plurality of flush symbols.

19. The method of claim 1, wherein the continuous phase modulation waveform is rotationally invariant.

20. The method of claim 1, wherein the set of modulation indices is selected from the group consisting of 4/16 and 5/16, 5/16 and 6/16, 6/16 and 7/16, and 12/16 and 13/16.

21. The method of claim 20, wherein there are 16 valid phase states.

22. The method of claim 5, wherein the sequence of symbols are interleaved over plural hopping frames.

23. The method of claim 7, wherein the step of decoding the set of demodulated data symbols includes summing the winning path metrics for each symbol for each predetermined phase offset, and selecting the phase offset with the largest total path metric sum as the valid solution.

24. The method of claim 8, wherein the accumulated frequency error of a previous hopping frame is multiplied by the ratio of the frequency of a next hopping frame to the frequency of said previous hopping frame and adjusts the demodulation frequency offset for said next hopping frame.

25. The method of claim 6 wherein the transmitted data signal is trellis coded.

26. The method of claim 6 wherein the transition period is a multiple of 4 symbol periods.

27. The method of claim 6 wherein the hopping frame is 48 symbols in length.

28. The method of claim 27 wherein the first 41 symbols are data symbols.

29. The method of claim 27 wherein one of the first 41 symbols is a pilot symbol.

30. The method of claim 27 wherein the $42^{nd}$, $43^{rd}$ and $44^{th}$ symbols are flush symbols.

31. The method of claim 6 wherein the continuous phase modulation waveform is rotationally invariant.

32. The method of claim 6 wherein the phase states represented by the symbols in the hopping frame cycle in a repeated sequence of even state, odd state, odd state even state.

33. The method of claim 6 wherein the set of modulation indices is selected from the group consisting of 4/16 and 5/16, 5/16 and 6/16, 6/16 and 7/16, and 12/16 and 13/16.

34. The method of claim 33 wherein there are 16 valid phase states for each known symbol.

35. The method of claim 6 wherein the step of decoding includes Viterbi decoding.

36. The method of claim 6 wherein the phase state is returned to zero by transition symbols.

37. The method of claim 36 wherein the transition symbols are ignored at the receiver.

38. A method for transmitting data in a multiple-modulation indices continuous phase modulation waveform with frequency hopping, comprising the steps of:
generating a first sequence of trellis coded symbols containing the transmitted data wherein the initial phase state is zero, and the first symbol of the first sequence is located in the first symbol period; and,
generating a second sequence of trellis coded symbols, wherein the number of symbols in the second sequence is equal to the constraint length defined by the multiple modulation indices and wherein the second sequence brings the phase state at the end of the second sequence to zero and the first symbol of the second sequence is adjacent to the last symbol of the first sequence, wherein the number of symbols in the first and second sequence combined are not greater than the fixed number of symbol periods.

39. The method of claim 38 wherein the last symbol of the first sequence is a pilot symbol.

40. The method of claim 38 wherein the symbols from the second sequence comprise a set of symbols from the first sequence.

41. The method of claim 38 further comprising the steps of generating a third sequence of trellis coded symbols wherein the number of symbols in the third sequence is a multiple of four symbols and wherein the phase state at the end of the third sequence is zero and the first symbol of the third sequence is adjacent the last symbol of the second sequence and wherein the number of symbols in the first, second and third sequence are equal to the predetermined number of symbol periods.

42. The method of claim 41 wherein the symbols from the third sequence comprise a set of symbols from the first sequence.

43. The method of claim 42 wherein the hopping frame is 48 symbols in length.

44. The method of claim 43 wherein the first 41 symbols are data symbols.

45. The method of claim 44 wherein the first 40 symbols are data symbols and the $41^{st}$ symbol is a pilot symbol.

46. The hopping frame of claim 44 wherein the $42^{nd}$, $43^{rd}$ and $44^{th}$ symbols are flush symbols.

47. The method of claim 46 wherein the remaining symbols are transition symbols.

48. The method of claim 38 wherein the multiple modulation indices are selected from the group consisting of 4/16 and 5/16, 5/16 and 6/16, 6/16 and 7/16, and 12/16 and 13/16.

49. The method of claim 38 wherein the first sequence of symbols are interleaved.

50. The method of claim 38 wherein the first sequence of symbols are Reed-Solomon coded.

51. The method of claim 42 wherein the phase state is zero at the beginning of the first sequence, the end of the second sequence and at the end of the third sequence.

52. A system for improving the electronic counter-countermeasure (ECCM) capabilities of a multiple modulation indices continuous phase modulation waveform communication system including a receiver, wherein the transmitted data is trellis coded and formed in a plurality of successive data packets, the improvement comprising at the receiver:
demodulating means for demodulating the data packets at a predetermined frequency and phase offset with a repeated sequence formed from a set of modulation indices thereby forming a set of demodulated symbols;
decoding means for decoding the set of demodulated data symbols wherein the decoder is sequenced to phase state "zero" at the beginning and end of each data packet; and, switching means for switching the frequency of the demodulating means to a different frequency for each successive data packet over a predetermined transition period.

53. The system of claim 52 wherein the demodulating means further comprises a means for demodulating the data packet synchronously at a plurality of predetermined phase offsets, thereby forming a plurality of sets of demodulated symbols.

54. The system of claim 53 wherein the decoding means comprises a summing means for summing the winning path metrics for each symbol in each set of the plurality of sets of demodulated symbols.

55. The system of claim 54 wherein the decoding means further comprises a processor for selecting one of the plurality of sets as a function of the total sum path metric stored in the summer for each set.

56. The system of claim 52, wherein the demodulating means comprises a tracking means for tracking and accumulating the frequency error of the phase offset during for each data packet and storage means for carrying over the accumulated frequency error to the subsequent hopping frame.

57. The system of claim 56, wherein the demodulating means further comprises a processor for adjusting the frequency offset for the next data packet based on the accumulated frequency error of previous data packet in the storage means and the demodulation frequencies of the next data packet and the previous data packet.

58. The system of claim 52 wherein the decoding means comprises a Viterbi decoder.

59. The system of claim 52, further including a de-interleaver after the decoding means.

* * * * *